May 8, 1951 O. N. BRYANT ET AL 2,552,401
REGULATING APPARATUS FOR EXTRACTION TURBINES
Filed Sept. 21, 1946 2 Sheets-Sheet 2

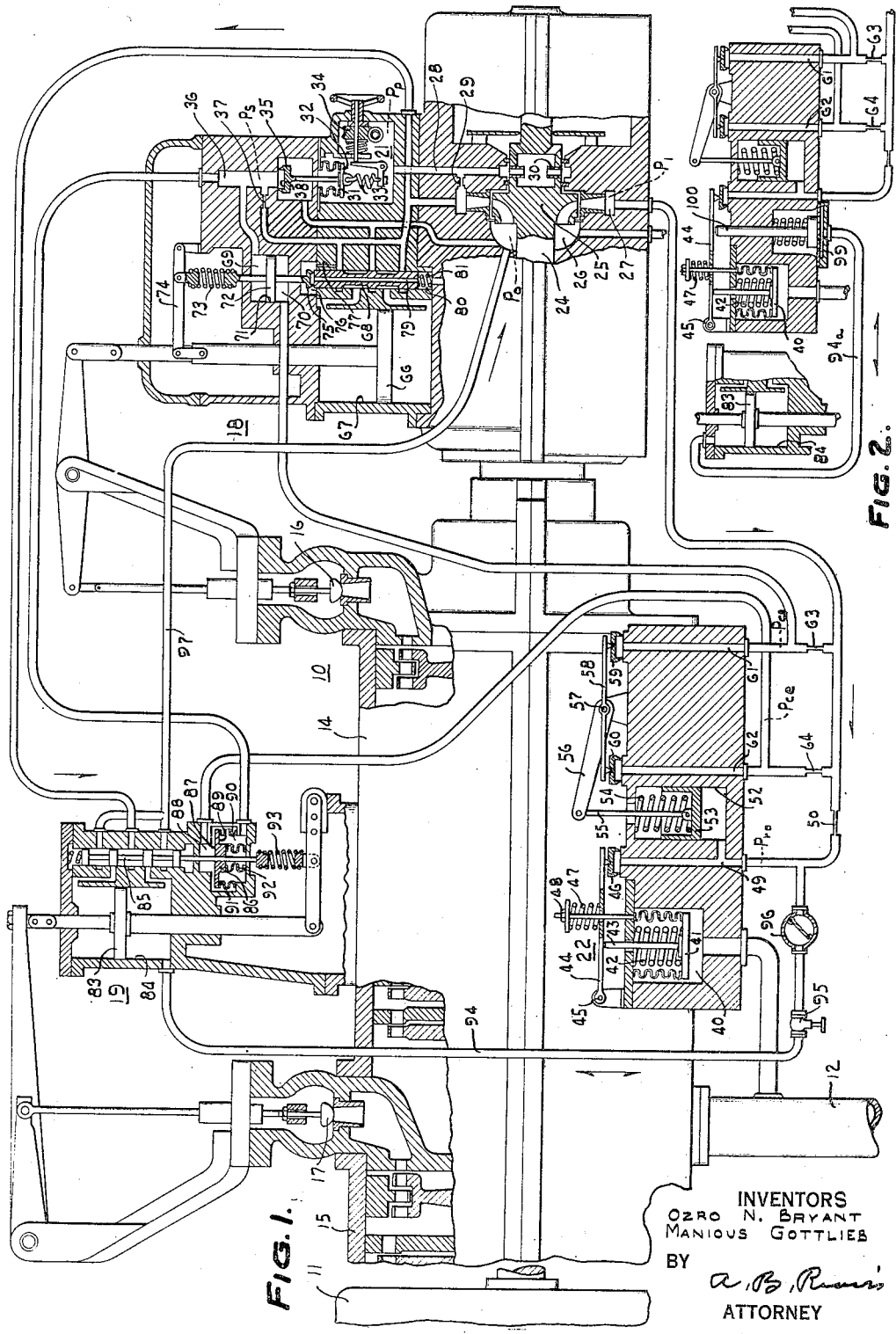

WITNESSES:
U. W. Novak
E. H. Lutz

INVENTORS
Ozro N. Bryant
Manious Gottlieb
BY
ATTORNEY

Patented May 8, 1951

2,552,401

UNITED STATES PATENT OFFICE 2,552,401

REGULATING APPARATUS FOR EXTRACTION TURBINES

Ozro N. Bryant, Prospect Park, and Manious Gottlieb, Philadelphia, Pa., assignors to Westinghouse Electric Corporation, East Pittsburgh, Pa., a corporation of Pennsylvania Application September 21, 1946, Serial No. 698,546

9 Claims. (Cl. 60—67)

The invention relates to an extraction turbine supplying heating or process steam and driving a generator and it has for an object to improve the governing or speed control thereof as the extraction valve reaches closed position to minimize frequency disturbance or tendency of the generator to carry an excessive portion of the load where it is connected in parallel with other generators in a synchronous system.

Where the admission and extraction valves of an extraction turbine are jointly controlled by a governor and by an extraction pressure regulator, a condition of over-bleeding, involving undesired increase in speed, may arise when the extraction valve reaches closed position. Assuming that the generator is carrying a light load with the turbine supplying an extraction demand such that the extraction valve is just closed, if the extraction demand increases further, consequent operation of the extraction pressure regulator can have no further closing effect on the extraction valve but it remains effective to operate against the governor and open the admission valve wider, the greater quantity of steam then flowing through the high-pressure section of the turbine being effective to increase the speed and frequency, or to increase the load carried by the generator where the latter is connected in parallel in a synchronous system. To avoid the possibility of this undesired operation upon closing of the extraction valve, we provide means responsive to closing of such valve to modify operation of the extraction pressure regulator to limit the controlling effect of the latter on the admission valve to correspond to the controlling effect thereof required just to close the extraction valve, with the result that the regulator is then ineffective to open the admission valve wider.

Accordingly, a more particular object of the invention is to provide, for an extraction turbine having the admission and extraction valves thereof under the joint control of a governor and an extraction regulator, means responsive to the extraction valve reaching closed position to modify the action of the regulator so as to limit its controlling effect on the admission valve to correspond to the controlling effect thereof required to just close the extraction valve.

The foregoing and other objects are effected by the invention as will be apparent from the following description and claims taken in connection with the accompanying drawings, forming a part of this application, in which:

Fig. 1 is a fragmentary view of the extraction turbine having the improved controlling system applied thereto and showing parts thereof in section;

Fig. 2 is a fragmentary detail view showing a modified form of the controlling system;

Figure 3:
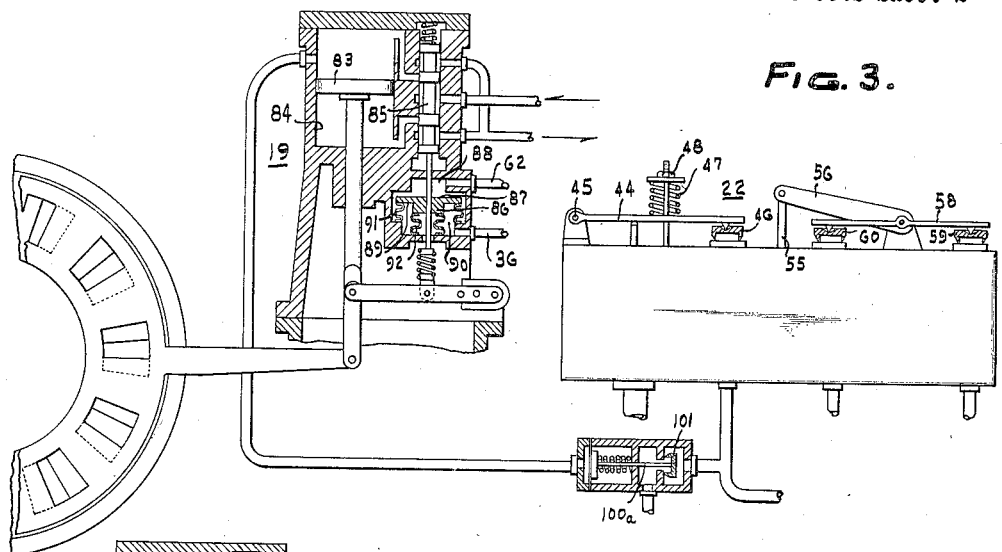
Fig. 3 is a detail view showing a third embodiment of the invention.

In Fig. 1, there is shown an extraction turbine, at 10, driving the generator 11 and supplying steam to the extraction or bleeder line 12. The turbine includes high and low-pressure sections 14 and 15, an admission valve 16 controlling the supply of steam to the high-pressure section, and the extraction valve 17 controlling the flow through the low-pressure section 15 of steam discharging from the high-pressure section 14, the extraction or bleeder line communicating with the turbine flow path between the exhaust end of the high-pressure section and the extraction valve.

The extraction valve 17 may be of the plug type, as shown in Fig. 1, where the steam pressures handled are relatively high, or of the grid type, as shown in Fig. 3, where pressures are lower.

The admission valve 16 and the extraction valve 17 are operated by the servo-motors, at 18, and, at 19, respectively, and which servo-motors are jointly controlled by the governor, at 21, and by the exhaust pressure regulator, at 22.

The turbine spindle 24 drives a centrifugal pump 25 having the suction space 26 and the discharge or pressure space 27, the suction pressure being designated $P_0$ and the discharge pressure as $P_1$ in Fig. 1.

The governor, at 21, is of the well-known hydraulic or pressure transformer type. It includes a pressure space 28 supplied with liquid under pressure, preferably from the pump discharge space 27, through the orifice 29 and from which liquid is discharged through the reversed-flow impeller 30, the reversed-flow impeller being responsive to speed of the turbine to maintain, by centrifugal resistance to flow, a primary pressure $P_p$ which varies substantially as the square of the speed, the reversed-flow impeller being claimed and more particularly described in the patent to Bryant, 2,035,689, of March 31, 1936, and in the patent to Schmidt, 2,256,963, of September 23, 1941.

A movable abutment 31 has its bottom area 32 exposed to the primary pressure $P_p$ and the force of such pressure acting on the abutment is opposed by the load spring 33, which may be adjusted by the speed changer 34.

The abutment 31 engages the depending stem of the cup valve 35 controlling the escape of liquid from the pressure space 36 supplied with liquid through the orifice 37 from the pump pressure space 27, this arrangement being more particularly disclosed and claimed in the patent to Bryant, 2,247,434, of July 21, 1941.

As the net upward force applied to the cup valve is balanced by the force of secondary pressure, $P_s$, in the space 36, if the primary pressure changes incident to change in load, then the consequent net upward force applied to the cup valve changes to change the secondary pressure $P_s$, the latter changing to maintain the ratio of the primary pressure change to the secondary pressure change equal to that of the cup valve pressure area 36 to the pressure area 32.

The pressure regulator, at 22, includes an expansible steam chamber 40 in communication with the extraction line 12 and having a bellows or diaphragm 41 exposed to the steam pressure, the force of such pressure acting on the bellows or diaphragm being opposed by the load spring 42 and the bellows or diaphragm having a stem 43 to bear against the lower side of the regulator relay lever 44 having one end fulcrumed, at 45, and having its other end engaging the relay cup valve 46. A compression spring 47 has its lower end engaging with the upper side of the relay lever and a nut 48 is engageable with the upper end of the spring for adjustment of the compression thereof.

The relay cup valve controls the escape of liquid from the regulator operating pressure space 49 supplied with liquid through an orifice 50 from the high-pressure space of the pump. As the regulator relay lever 44 seeks an equilibrium position in which the moments of forces applied thereto in opposite directions are balanced, it will be apparent that change in steam pressure in consequence of change in extraction demand or change in adjustment of the spring 47 is accompanied by change in the regulator operating pressure $P_{ro}$.

The regulator pressure space 49 includes the operating cylinder 52 for the operating piston 53 engaged by the load spring 54.

Therefore, the position of the operating piston 53 in the cylinder 52 depends upon the extraction pressure. If the extraction pressure declines due to increase in the extraction demand, the force of extraction steam pressure exerted on the relay lever 44 is reduced and the force of the spring 47 acting thereon is correspondingly increased, thereby causing the cup valve to increase the regulator operating pressure $P_{ro}$ and moving the piston 53 upwardly until the increasing force of the spring 54 balances the increase in force of the regulator operating pressure.

The piston 53 has a stem 55 connected to the outer end of the crank arm 56 attached to the rockshaft 57. A spring lever 58 is connected at its midpoint to the rockshaft and the outer ends thereof engage the cup valves 59 and 60 for the pressure spaces 61 and 62 supplied with liquid through the orifices 63 and 64, respectively, from the pump 25, the cup valves 59 and 60 cooperating with the pressure spaces 61 and 62 to maintain regulator control pressures for the admission valve and the extraction valve and which pressures are designated $P_{cg}$ and $P_{ce}$, respectively.

If the extraction demand increases, the regulator operating liquid pressure $P_{ro}$ is increased proportionately and the regulator operating piston 53 is moved up proportionately. Such upward movement of the operating piston causes the rockshaft 57 to turn clockwise to increase the regulator control pressure $P_{cg}$ and to decrease the regulator control pressure $P_{ce}$ in proportion to the increase in extraction demand. If the extraction demand decreases, the contrary operation takes place, the regulator control pressure $P_{cg}$ for the governor valve decreasing and the control pressure $P_{ce}$ for the extraction valve increasing in proportion to the increase in extraction pressure pursuant to the decrease in extraction demand.

The servo-motor, at 18, is of a conventional type, it including an operating piston 66 arranged in an operating cylinder 67 and mechanically connected to the admission valve 16. A relay 68 controls the admission and exhaust of motive fluid to the operating cylinder to open and close the admission valve.

Sensitivity is increased by relieving the governor and regulator pressures $P_s$ and $P_{cg}$ of the burden of moving the relay 68, such pressures being supplied to the upper and lower spaces 69 and 70 of the cylinder 71 and which spaces are separated by the piston 72, secondary pressure $P_s$ being supplied to the upper space 69 and regulator control pressure $P_{cg}$ being supplied to the space 70. The piston 72 is connected, by a tension spring 73, to the follow-up lever 74 operatively connected to the operating piston 66.

The piston 72, therefore, normally occupies an equilibrium position, the downwardly acting force of the governor pressure $P_s$ applied to the piston 72 being balanced by the upwardly acting force of the regulator control pressure $P_{cg}$ and of the spring 73. Assuming an increase in speed due to decrease in load and consequent increase in the governing pressure $P_s$, it will be apparent that the piston 72 will move downwardly until the increasing spring force balances the increase in force of the governing pressure. Decrease in turbine speed results in the contrary operation, the follow-up spring 73 then moving the piston upwardly until its force is decreased to balance the decrease in governing pressure.

Movement of the piston 72 controls the hydraulic means for moving the relay 68. Preferably, as illustrated, the means disclosed and claimed in the patent to Schwendner, No. 2,224,321, granted December 10, 1940, is used. Accordingly, the piston 72 carries a depending cup valve 75 arranged in the pressure space 76 supplied with liquid through the orifice 77. The relay 68 has its upper end exposed to the pressure existing in the space 76 and it has a bore 79 communicating with the drain space 80 containing the spring 81 exerting upward force on the lower end of the relay. As the relay normally occupies a position with the spring force acting upwardly on its lower end balanced by the force of liquid pressure acting downwardly on its upper end, it will be apparent that any movement of the cup valve 75 is productive of change of liquid pressure in the space 76 to cause the relay to follow the cup valve.

The extraction valve servo-motor, at 19, includes an operating piston 83 arranged in the operating cylinder 84 and a relay 85 for controlling the admission and exhaust of motive liquid to the upper and lower ends of the operating cylinder, the operating piston being mechanically connected to the extraction valve 17 and the arrangement being such that upward movement of the relay 85 results in downward movement of the operating piston 83 to move the valve 17 in a closing direction.

The relay 85 is connected to an abutment 86 having an upwardly-facing pressure area 87 exposed to liquid under pressure in the space 88 and a lower pressure area 89 exposed to pressure of liquid in the space 90, the spaces 88 and 90 being separated by the bellows 91 connecting the abutment and the housing and the space 90 having its inner wall provided by the bellows 92 connecting the abutment and the housing.

The effect of the extraction pressure regulator, at 22, on the admission and exhaust valves 16 and 17 is to oppose the effect of the governor, at 21, thereon, the governor tending to open the valves and the regulator tending to close them; however, as the extraction pressure regulator provides controlling effects which change in opposite directions, one increasing while the other decreases, the valve subject to the increasing effect will open wider and the one subject to the decreasing effect will be restricted.

The governing pressure $P_s$ is, therefore, supplied to the pressure space 69 of the admission valve servo-motor relay and to the pressure space 90 of the extraction valve servo-motor relay.

With the extraction valve nearly closed, very little movement on the part of the regulator is required to complete closing thereof, that is, very little change in extraction demand is necessary for this purpose. Therefore, under such conditions, a small increase in extraction demand suffices to close the extraction valve; and, with the extraction valve closed, any further increase in extraction demand results in wider opening of the admission valve and overspeeding of the turbine. The present invention involves the provision of means effective to prevent this undesired action.

In Fig. 1, a pipe 94 connects the bottom end of the extraction valve servo-motor operating cylinder 84 to the regulator operating liquid pressure space 49, the pipe being provided with a cut-off valve 95 and a check valve 96, the latter being arranged to open for flow toward the operating cylinder whenever the pressure therein falls below the regulator operating pressure $P_{ro}$. When the extraction valve servo-motor operating piston 83 reaches the bottom, or extraction-valve-closed, position, any further upward movement of the relay 85 causes the pressure at the bottom end of the operating cylinder 84 to fall rapidly toward a value equal to that in the pump suction space 26, the exhaust passage 97 for the operating cylinder being connected to the pump suction space and the relay then placing the cylinder space below the piston 83 in communication with the pump suction space.

As soon as the pressure at the bottom end of the cylinder 84 drops below the regulator operating liquid pressure, the check valve 96 opens to permit of decrease in the regulating operating pressure, in consequence of which the regulator operating piston 53 ceases to move upwardly so that the regulator extraction valve control pressure $P_{ce}$ stops decreasing and the regulator admission valve control pressure $P_{cg}$ stops increasing. By stopping the increase in the regulator control pressure for the admission valve, wider opening of the latter in consequence of increase in extraction demand is thereby prevented and by stopping the decrease in regulator control pressure for the extraction valve, further upward movement of the relay 85 is prevented and pressure at the bottom end of the cylinder 84 is thereby prevented from decreasing further. Whenever the pressure in the operating cylinder is greater than the regulator operating pressure, the check valve closes, thereby rendering the pressure regulator free to assume control.

In Fig. 2, a pipe 94a is connected to the top end of the operating cylinder 84 and to a pressure-responsive diaphragm 99 having a push rod 100 engageable with the underside of the regulator relay lever 44. When the piston 83 strikes its lower stop, the extraction valve then reaching closed position, the pressure above the piston rises and acts on the diaphragm 99 to move the push rod upwardly against the relay lever 44, thus taking control from the steam bellows or pressure-responsive device.

In Fig. 3, there is shown an arrangement which is similar to Fig. 2, except that the stem or push rod 100a, instead of lifting the relay lever 44, opens a small valve 101 to reduce the regulator operating pressure below the operating piston 53.

Figure 4:
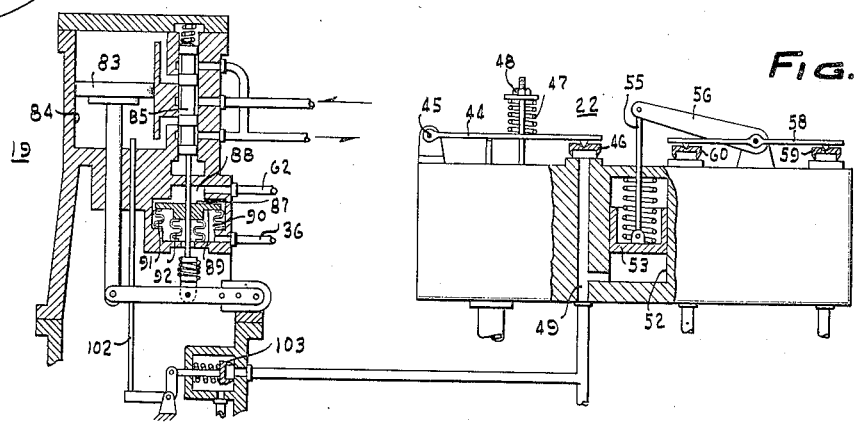
Figs. 4 and 5 are detail views showing fourth and fifth modifications of the invention.

In Fig. 4, as the operating piston 83 for the extraction valve reaches its bottom position, it moves an abutment or push rod 102 to open a valve 103 to provide for drop in pressure below the regulator operating piston 53.

Figure 5:
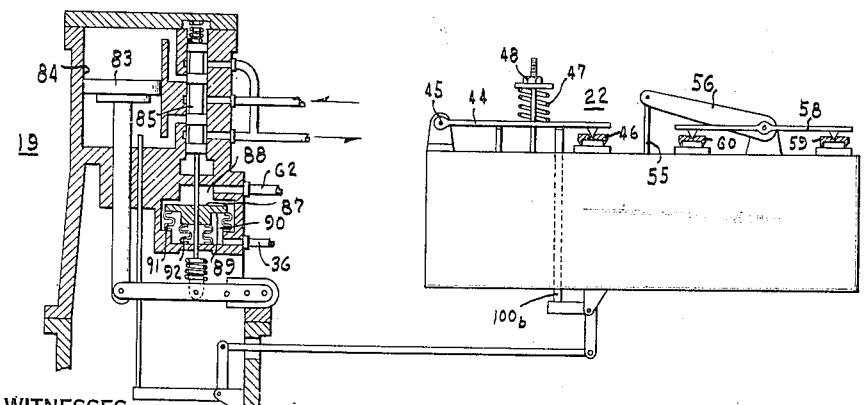

Fig. 5 shows a fifth embodiment of the invention wherein motion of the operating piston 83 is transmitted to a push rod 100b, as shown in Fig. 2, for effecting decline in pressure in the regulator operating cylinder in any suitable manner.

While the invention has been shown in several forms, it will be obvious to those skilled in the art that it is not so limited, but is susceptible of various other changes and modifications without departing from the spirit thereof.

What is claimed is:

1. The combination with an extraction turbine including high and low-pressure blading sections, an extraction line communicating with the turbine flow path between the sections, a valve controlling the admission of steam to the high-pressure section, and an extraction valve controlling the admission of steam for flow through the low-pressure section and discharging from the high-pressure section; of a governor driven by the turbine and controlling the valves for movement in closing directions in response to increase in speed; a regulator responsive to extraction demand and controlling the valves for movement in opposite directions such that, with increase in extraction demand, the admission valve is moved in an opening direction and the extraction valve is moved in a closing direction and vice versa; and means responsive to the extraction valve reaching closed position to modify the action of the regulator to render the latter ineffective to move the admission valve further in an opening direction with further increase in extraction demand.

2. The combination with an extraction turbine including high and low-pressure blading sections, an extraction line communicating with the turbine flow path between the sections, a valve controlling the admission of steam to the high-pressure section, and an extraction valve controlling the admission of steam for flow through the low-pressure section and discharging from the high-pressure section; of a governor driven by the turbine and providing a control effect dependent upon speed; a regulator responsive to extraction steam pressure to provide first and second control effects which change in opposite directions with changes in extraction demand; admission and extraction valve operating means for opening and closing the valves in response to said governor and regulator control effects such that the governor control effect tends to render both operating means effective to close the valves and the first and second regulator control effects oppose the action of the governor control effect on the admission and extraction valve operating means, respectively, so that the operating means subject to the regulator control effect changing in one direction moves its valve in an opening direction and the operating means subject to the regulator control effect changing in the other direction moves its valve in a closing direction; and means responsive to the extraction valve reaching closed position to modify action of the regulator to stop further change of the first control effect in said one direction in response to further increase in extraction demand.

3. The combination with an extraction turbine including high and low-pressure blading sections, an extraction line communicating with the turbine flow path between the sections, a valve controlling the admission of steam to the high-pressure section, and an extraction valve controlling the admission of steam for flow through the low-pressure section and discharging from the high-pressure section; of a governor driven by the turbine and providing a control pressure dependent upon speed, a regulator responsive to extraction pressure to provide first and second control pressures which change in opposite directions with changes in extraction demand, means responsive to the governor control pressure and the regulator first control pressure to move the admission valve in opening and closing directions, means responsive to the governor control pressure and to the regulator second control pressure to move the extraction valve in opening and closing directions, and means responsive to the extraction valve reaching closed position to stop further change of the first control pressure in the direction for wider opening of the admission valve with further increase in extraction demand.

4. The combination with an extraction turbine including high and low-pressure blading sections, an extraction line communicating with the turbine flow path between the sections, a valve controlling the admission of steam to the high-pressure section, and an extraction valve controlling the admission of steam for flow through the low-pressure section and discharging from the high-pressure section; of a governor driven by the turbine and providing a control pressure dependent upon speed; a regulator including means providing an operating pressure dependent upon extraction pressure and means operated by the operating pressure to provide first and second control pressures which change in opposite directions with changes in extraction pressure; means responsive to governor control pressure and to the regulator first control pressure to move the admission valve in opening and closing directions; means responsive to the governor control pressure and to the regulator second control pressure for moving the extraction valve in opening and closing directions; and means responsive to the extraction valve reaching closed position to stop continued change in the same direction of the regulator operating pressure with further decrease in extraction pressure to avoid further change in the regulator first control pressure in a direction for wider opening of the admission valve.

5. The combination with an extraction turbine including high and low-pressure blading sections, an extraction line communicating with the turbine flow path between the sections, a valve controlling the admission of steam to the high-pressure section, and an extraction valve controlling the admission of steam for flow through the low-pressure section and discharging from the high-pressure section; of a governor driven by the turbine and providing a control pressure which increases with decrease in load and vice versa; a regulator including means responsive to extraction pressure to provide an operating pressure which increases as the extraction pressure decreases and vice versa, and means operated by the operating pressure to provide a first control pressure which increases as the operating pressure increases and vice versa and to provide a second control pressure which decreases as the operating pressure increases and vice versa; means responsive to the governor control pressure and to the regulator first control pressure for moving the admission valve in opening and closing directions such that when said first control pressure is increasing it overcomes the governor control pressure to move the valve in an opening direction and when it is decreasing it is overcome by the governor control pressure to move the valve in a closing direction; means responsive to the governor control pressure and to the regulator second control pressure for moving the extraction valve in opening and closing directions such that when the second control pressure is decreasing it is overcome by the governor control pressure to move the valve in a closing direction and when it is increasing it overcomes the governor control pressure to move the valve in an opening direction; and means responsive to the extraction valve reaching closed position to stop further increase in the regulator operating pressure and consequent further increase in the regulator first control pressure to avoid opening of the admission valve wider with further decrease in extraction pressure pursuant to further increase in extraction demand.

6. The combination with an extraction turbine including high and low-pressure blading sections, an extraction line communicating with the turbine flow path between the sections, a valve controlling the admission of steam to the high-pressure section, an extraction valve controlling the admission of steam for flow through the low-pressure section and discharging from the high-pressure section, and admission and extraction valve servo-motors for moving the valves in opening and closing directions; of a governor driven by the turbine and providing a control pressure which increases with decrease in load and vice versa; a regulator including means responsive to extraction pressure to provide an operating pressure which increases as the extraction pressure decreases and vice versa, and means operated by the operating pressure to provide a first control pressure which increases as the operating pressure increases and vice versa and to provide a second control pressure which decreases as the operating pressure increases and vice versa; means responsive to the opposed action of governor control pressure and of the regulator first control pressure to control the operation of the admission valve servo-motor, whereby, when the latter pressure is increasing, the valve is moved in an opening direction and vice versa; means responsive to the opposed action of governor control pressure and of the regulator second control pressure to control the operation of the extraction valve servo-motor, whereby, when the latter pressure is decreasing, the valve is moved in a closing direction and vice versa; and means responsive to an operating condition of the extraction valve servo-motor when the extraction valve is closed to relieve the regulator operating pressure to stop further increase in said first control pressure pursuant to further decrease in extraction pressure.

7. The combination with an extraction turbine including high and low-pressure blading sections, an extraction line communicating with the turbine flow path between the sections, a valve controlling the admission of steam to the high-pressure section, an extraction valve controlling the admission of steam for flow through the low-pressure section and discharging from the high-pressure section, and admission and extraction valve servo-motors including cylinders and pistons movable in the latter and operatively connected to the valves; of a governor driven by the turbine and providing a control pressure which increases with decrease in load and vice versa; a regulator including means responsive to extraction pressure to provide an operating pressure which increases as the extraction pressure decreases and vice versa, and means operated by the operating pressure to provide a first control pressure which increases as the operating pressure increases and vice versa and to provide a second control pressure which decreases as the operating pressure increases and vice versa; means responsive to the opposed action of the governor control pressure and of the regulator first control pressure to control the operation of the admission valve servo-motor, whereby, when the latter pressure is increasing, the valve is moved in an opening direction and vice versa; means responsive to the opposed action of the governor control pressure and of the regulator second control pressure to control the operation of the extraction valve servo-motor, whereby, when the latter pressure is decreasing, the valve is moved in a closing direction and vice versa; a pipe communicating with the extraction valve servo-motor cylinder at one end of the latter; and means providing for the connection of the other end of the pipe to the regulator so that the pressure condition existing in said one end of the cylinder is effective to prevent further increase in regulator operating pressure when the extraction valve servo-motor piston is at its stroke end for closing the extraction valve to stop further increase in the first regulator control pressure in response to further decrease in extraction pressure.

8. The combination with an extraction turbine including high and low-pressure blading sections, an extraction line communicating with the turbine flow path between the sections, a valve controlling the admission of steam to the high-pressure section, an extraction valve controlling the admission of steam for flow through the low-pressure section and discharging from the high-pressure section and admission and extraction valve servo-motors including cylinders with pistons movable in the latter and operatively connected to the valves; of a governor driven by the turbine and providing a control pressure which increases with decrease in load and vice versa; a regulator including means providing an operating pressure space, means responsive to extraction pressure to provide an operating pressure in said space and which operating pressure increases as the extraction pressure decreases and vice versa, means exposed to the operating pressure in said space and movable in response thereto to provide a first control pressure which increases as the operating pressure increases and vice versa and to provide a second control pressure which decreases as the operating pressure increases and vice versa; means responsive to the opposed action of governor control pressure and of regulator first control pressure to control the operation of the admission valve servo-motor, whereby, when the latter pressure is increasing the admission valve is moved in an opening direction and vice versa; means responsive to the opposed action of governor control pressure and of the regulator second control pressure to control the operation of the extraction valve servo-motor, whereby, when the latter pressure is decreasing, the valve is moved in a closing direction and vice versa; a pipe having one end connected to the end of the extraction valve servo-motor cylinder adjacent to the piston of the latter when such piston is at its extraction-valve-closing stroke end and having its other end connected to the regulator operating pressure space; and a check valve in said pipe and opening toward the servo-motor cylinder, whereby, when the pressure in the space of the servo-motor cylinder in communication with the pipe is lower than that in the operating pressure space of the regulator, said operating pressure is prevented from increasing further to stop further increase in the regulator first control pressure with further decrease in extraction pressure.

9. The combination with an extraction turbine including high and low-pressure blading sections, an extraction line communicating with the turbine flow path between the sections, a valve controlling the admission of steam to the high-pressure section, an extraction valve controlling the admission of steam for flow through the low-pressure section and discharging from the high-pressure section, and admission and extraction valve servo-motors including cylinders with pistons movable therein and operatively connected to the valves; of a governor driven by the turbine and providing a control pressure which increases with decrease in load and vice versa; a regulator including means providing an operating pressure space, means responsive to extraction pressure to provide operating pressure in said space and which operating pressure increases as the extraction pressure decreases and vice versa, and means responsive to the operating pressure to provide a first control pressure which increases as the operating pressure increases and vice versa and to provide a second control pressure which decreases as the operating pressure increases and vice versa; means responsive to the opposed action of governor control pressure and of the regulator first control pressure to control the operation of the admission valve servo-motor, whereby, when the latter pressure is increasing, the valve is moved in an opening direction and vice versa; means responsive to the opposed action of governor control pressure and of the regulator second control pressure to control the operation of the extraction valve servo-motor, whereby, when the latter pressure is decreasing, the valve is moved in a closing direction and vice versa; and means responsive to the extraction valve servo-motor piston reaching its extraction-valve-closing stroke end to relieve the operating pressure in said space to stop further increase in the regulator first control pressure pursuant to further decrease in extraction pressure.

OZRO N. BRYANT.
MANIOUS GOTTLIEB.

REFERENCES CITED

The following references are of record in the file of this patent:

UNITED STATES PATENTS

| Number | Name | Date |
| --- | --- | --- |
| 1,854,006 | Warner | Apr. 12, 1932 |
| 2,262,562 | Bryant | Nov. 11, 1941 |